US012242980B2

(12) United States Patent
Ram et al.

(10) Patent No.: US 12,242,980 B2
(45) Date of Patent: Mar. 4, 2025

(54) MACHINE LEARNING WITH MULTIPLE CONSTRAINTS

(71) Applicant: INTERNATIONAL BUSINESS MACHINES CORPORATION, Armonk, NY (US)

(72) Inventors: Parikshit Ram, Atlanta, GA (US); Dakuo Wang, Cambridge, MA (US); Deepak Vijaykeerthy, Bangalore (IN); Vaibhav Saxena, New Delhi (IN); Sijia Liu, Somerville, MA (US); Arunima Chaudhary, Boston, MA (US); Gregory Bramble, Larchmont, NY (US); Horst Cornelius Samulowitz, White Plains, NY (US); Alexander Gray, Yonkers, NY (US)

(73) Assignee: International Business Machines Corporation, Armonk, NY (US)

(*) Notice: Subject to any disclaimer, the term of this patent is extended or adjusted under 35 U.S.C. 154(b) by 1097 days.

(21) Appl. No.: 17/015,243

(22) Filed: Sep. 9, 2020

(65) Prior Publication Data
US 2022/0076144 A1 Mar. 10, 2022

(51) Int. Cl.
G06N 5/04 (2023.01)
G06F 9/38 (2018.01)
G06F 18/243 (2023.01)

(52) U.S. Cl.
CPC ............. G06N 5/04 (2013.01); G06F 9/38 (2013.01); G06F 18/24323 (2023.01)

(58) Field of Classification Search
CPC ................................ G06N 5/04; G06F 9/38
USPC ....................................................... 706/47
See application file for complete search history.

(56) References Cited

U.S. PATENT DOCUMENTS

| 7,272,575 | B2 | 9/2007 | Vega |
| 8,429,097 | B1 | 4/2013 | Sivasubramanian |
| 9,306,419 | B2 | 4/2016 | Qian |
| 9,483,811 | B2 | 11/2016 | Ahmed |
| 9,577,463 | B2 | 2/2017 | McCoy |

(Continued)

FOREIGN PATENT DOCUMENTS

| EP | 3633959 A1 | 4/2020 |
| WO | 2017058389 A1 | 4/2017 |

OTHER PUBLICATIONS

Chengrun Yang, Jicong Fan, Ziyang Wu, and Madeleine Udell. 2020. AutoML Pipeline Selection: Efficiently Navigating the Combinatorial Space. In Proceedings of the 26th ACM SIGKDD International Conference on Knowledge Discovery & Data Mining (KDD '20). ACM, New York, NY, USA, 1446 (Year: 2020).*

(Continued)

Primary Examiner — James T Tsai
(74) Attorney, Agent, or Firm — Caleb D. Wilkes

(57) ABSTRACT

The exemplary embodiments disclose a method, a computer program product, and a computer system for determining that one or more model pipelines satisfy one or more constraints. The exemplary embodiments may include detecting a user uploading data, one or more constraints, and one or more model pipelines, collecting the data, the one or more constraints, and the one or more model pipelines, and determining that one or more of the model pipelines satisfies all of the one or more constraints based on applying one or more algorithms to the collected data, constraints, and model pipelines.

20 Claims, 12 Drawing Sheets

(56) References Cited

U.S. PATENT DOCUMENTS

| | | | |
|---|---|---|---|
| 9,860,358 B2 | 1/2018 | Park | |
| 10,141,791 B2 | 11/2018 | Bell | |
| 10,452,992 B2 | 10/2019 | Lee | |
| 2017/0117732 A1 | 4/2017 | Cheatham, III | |
| 2018/0014130 A1* | 1/2018 | Lunner | H04R 25/554 |
| 2018/0175672 A1 | 6/2018 | Yoden | |
| 2019/0018866 A1* | 1/2019 | Ormont | G06F 16/212 |
| 2019/0147371 A1 | 5/2019 | Deo | |
| 2019/0377984 A1* | 12/2019 | Ghanta | G06F 18/2155 |
| 2020/0005135 A1* | 1/2020 | Che | G06N 3/084 |
| 2020/0034665 A1* | 1/2020 | Ghanta | G06N 3/08 |
| 2020/0133964 A1 | 4/2020 | Lee | |
| 2020/0184382 A1* | 6/2020 | Fishkov | G06N 20/20 |
| 2020/0272909 A1* | 8/2020 | Parmentier | G06N 3/126 |
| 2021/0081848 A1* | 3/2021 | Polleri | G06F 11/3409 |
| 2021/0151187 A1* | 5/2021 | Mansi | G16H 50/20 |
| 2021/0224585 A1* | 7/2021 | Schmidt | G06F 9/3836 |
| 2021/0264311 A1* | 8/2021 | Mukherjee | G06N 20/20 |
| 2021/0304028 A1* | 9/2021 | Weidele | G06N 5/04 |
| 2021/0326717 A1* | 10/2021 | Mueller | G06Q 10/06 |
| 2021/0326736 A1* | 10/2021 | Kishimoto | G06F 18/217 |
| 2022/0035877 A1* | 2/2022 | Nittur Sridhar | G06N 3/086 |
| 2022/0036246 A1* | 2/2022 | Chen | G06N 5/022 |
| 2022/0067752 A1* | 3/2022 | Fang | H04L 63/20 |
| 2023/0186150 A1* | 6/2023 | Belakaria | G06N 7/01 706/12 |

OTHER PUBLICATIONS

Automatic construction of machine learning pipelines Gijsbers, P. (Author). Oct. 30, 2017 (Year: 2017).*

Sun et al., ReinBo: Machine Learning Pipeline Conditional Hierarchy Search and Configuration with Bayesian Optimization Embedded Reinforcement Learning, in Machine Learning and Knowledge Discovery in Databases, 2020, vol. 1167 (Year: 2020).*

Wei, Ermin, and Asuman Ozdaglar. "Distributed Alternating Direction Method of Multipliers." 2012 IEEE 51st IEEE Conference on Decision and Control (CDC) (Dec. 2012). (Year: 2012).*

Han, D., Yuan, X. A Note on the Alternating Direction Method of Multipliers. J Optim Theory Appl 155, 227-238 (2012) (Year: 2012).*

Piali Das, et al.,2020. Amazon SageMaker Autopilot: a white box AutoML solution at scale. In Proceedings of the Fourth International Workshop on Data Management for End-to-End Machine Learning (DEEM'20). Association for Computing Machinery, New York, NY, USA, Article 2, 1-7. (Year: 2020).*

Alexandre Quemy, Two-stage optimization for machine learning workflow, Information Systems, vol. 92, 2020. (Year: 2020).*

Quemy, Alexandre. "Data Pipeline Selection and Optimization." International Workshop on Data Warehousing and OLAP (2019). (Year: 2019).*

Yang, Yu & Guan, Xiaohong & Jia, Qing-Shan & Yu, Liang & Xu, Bolun & Spanos, Costas. (2022). A Survey of ADMM Variants for Distributed Optimization: Problems, Algorithms and Features. (Year: 2022).*

Hutter, F. et al., Automated Machine Learning, Methods, Systems, Challenges, Springer 2019, 223 total pages. (Year: 2019).*

El Shawi, Radwa & Maher, Mohamed & Sakr, Sherif. (2019). Automated Machine Learning: State-of-The-Art and Open Challenges. (Year: 2019).*

Shang, Z. et al. 2019. Democratizing Data Science through Interactive Curation of ML Pipelines. In Proceedings of the 2019 International Conference on Management of Data (SIGMOD '19). Association for Computing Machinery, New York, NY, USA, 1171-1188. (Year: 2019).*

Shang, Z. et al., "Alpine Meadow: A System for Interactive AutoML," 33rd Conf. on Neural Information Processing Systems (NeurIPS 2019, Vancouver, Canada, 10 pages. (Year: 2019).*

Doris Xin, Litian Ma, Jialin Liu, Stephen Macke, Shuchen Song, Aditya Parameswaran. 2018. Accelerating Human-in-the-loop Machine Learning: Challenges and Opportunities. In DEEM'18: International Workshop on Data Management for End-to-End Machine, Jun. 15, 2018, Houston, TX, USA. ACM, (Year: 2018).*

Boyd et al., "Distributed Optimization and Statistical LEarning via the Alternating Direction Method of Multipliers," in Foundation & Trends in Machine Learning, vol. 3, No. 1, (c) 2011, 1-122. (Year: 2011).*

P. Brazdil, C et al. Metalearning: Applications to Data Mining. Springer, 2009. (Year: 2009).*

Schoenfeld, B., Giraud-Carrier, C., Poggemann, M., Christensen, J., & Seppi, K. (2018). Preprocessor selection for machine learning pipelines. arXiv preprint arXiv: 1810.09942. (Year: 2018).*

Glowinski, R. On Alternating Direction Methods of Multipliers: A Historical Perspective. In: Fitzgibbon, W., Kuznetsov, Y., Neittaanmaki, P., Pironneau, O. (eds) Modeling, Simulation and Optimization for Science and Technology. Computational Methods in Applied Sciences, vol. 34. (Year: 2014).*

E. Wei and A. Ozdaglar, "Distributed Alternating Direction Method of Multipliers," 2012 IEEE 51st IEEE Conference on Decision and Control (CDC), Maui, HI, USA, 2012, pp. 5445-5450, doi: 10.1109/CDC.2012.6425904. (Year: 2012).*

Hospedales, T., Antoniou, A., Micaelli, P., & Storkey, A. (2021). Meta-learning in neural networks: A survey. IEEE transactions on pattern analysis and machine intelligence, 44(9), 5149-5169. (Year: 2021).*

Yang, C. et al.,"OBIE: Collaborative Filtering for AutoML Model Selection," KDD '19, Aug. 4-8, 2019, Anchorage, AK, USA, pp. 1173-1183. (Year: 2019).*

Mohr, Felix and Marcel Wever. "Naive Automated Machine Learning—A Late Baseline for AutoML." ArXiv abs/2103.10496 (2021): n . pag. (Year: 2021).*

Daniel Gabay, Bertrand Mercier, A dual algorithm for the solution of nonlinear variational problems via finite element approximation, Computers & Mathematics with Applications, vol. 2, Issue 1, 1976, pp. 17-40. (Year: 1976).*

Moskvitch, K., "AI for AI set to make it easy to create machine learning algorithms," IBM Research Blog, Feb. 3, 2020, 13 pages total. (Year: 2020).*

Li, Yang, Jiawei Jiang, Jinyang Gao, Yingxia Shao, Ce Zhang, and Bin Cui. "Efficient automatic CASH via rising bandits." In Proceedings of the AAAI Conference on Artificial Intelligence, vol. 34, No. 04, pp. 4763-4771. 2020. (Year: 2020).*

Marinescu, R., Kishimoto, A., Ram, P., Rawat, A., Wistuba, M., Palmes, P. P., & Botea, A. (May 2021). Searching for machine learning pipelines using a context-free grammar. In Proceedings of the AAAI Conference on Artificial Intelligence (vol. 35, No. 10, pp. 8902-8911). (Year: 2021).*

Ram, Parikshit, Sijia Liu, Deepak Vijaykeerthi, Dakuo Wang, Djallel Bouneffouf, Greg Bramble, Horst Samulowitz, and Alexander G. Gray. "Solving constrained cash problems with admm." arXiv preprint arXiv:2006.09635 (2020). (Year: 2020).*

Vanschoren, Joaquin. "Meta-learning: A survey." arXiv preprint arXiv:1810.03548 (2018). (Year: 2018).*

C Thornton, F. Hutter, Holger H. Hoos, and Kevin Leyton-Brown. 2013. Auto-WEKA: combined selection and hyperparameter optimization of classification algorithms. In Proceedings of the 19th ACM SIGKDD international conference on Knowledge discovery and data mining (KDD '13). New York, NY, USA, 847-855 (Year: 2013).*

X. Guo, B. van Stein and T. Bäck, "A New Approach Towards the Combined Algorithm Selection and Hyper-parameter Optimization Problem," 2019 IEEE Symposium Series on Computational Intelligence (SSCI), Xiamen, China, 2019, pp. 2042-2049 (Year: 2019).*

Kotthoff, Lars. "Algorithm selection for combinatorial search problems: A survey." Data mining and constraint programming: Foundations of a cross-disciplinary approach (2016): 149-190. (Year: 2016).*

Hu, Y., Chi, E.C., Allen, G.I. (2016). ADMM Algorithmic Regularization Paths for Sparse Statistical Machine Learning. In: Glowinski, R., Osher, S., Yin, W. (eds) Splitting Methods in Communication, Imaging, Science, and Engineering. Scientific Computation. Springer, Cham. (Year: 2016).*

(56) References Cited

OTHER PUBLICATIONS

Maron, Oden, and Andrew W. Moore. "The racing algorithm: Model selection for lazy learners." Artificial Intelligence Review 11 (1997): 193-225. (Year: 1997).*

Billman et al., "Automated Discovery in Managerial Problem Formulation: Formation of Casual Hypotheses for Cognitive Mapping", https://onlinelibrary.wiley.com/doi/abs/10.1111/j.1540-5915.1993.tb00460.x, Decision Sciences/ vol. 24, Issue 1, Jan. 1993, pp. 1-23.

Drozdal et al., "Trust in AutoML: Exploring Information Needs for Establishing Trust in Automated Machine Learning Systems", 2020 Association for Computing Machinery, Jan. 17, 2020, pp. 1-11.

Grace Period Disclosure, Chen, "IBM Research AI at ICLR 2020: Advancing Trusted, Secure and Precision-Focused AI", https://www.ibm.com/blogs/research/2020/04/ibm-research-iclr-2020-ad . . . , made available to the public on Apr. 24, 2020, pp. 1-16.

Grace Period Disclosure, Liu et al., "An ADMM Based Framework for AutoML Pipeline Configuration", https://arxiv.org/abs/1905.00424, made available to the public on Dec. 6, 2019, pp. 1-34.

Grace Period Disclosure, Liu, presented at the AAAI '20 Conference on Feb. 10, 2020, https://aaai.org/ojs/index.bhp/AAAI/article/view/5926, "An ADMM Based Framework for AutoML Pipeline Configuration", pp. 1-3.

Grace Period Disclosure, Sattigeri et al., "IBM Research at ICML 2020", made available to the public at the ICLR 2020 conference on Jul. 12, 2020, https://www.ibm.com/blogs/research/2020/07/ibm-research-at-icml-2020/, pp. 1-12.

He et al., "AMC: AutoML for Model Compression and Acceleration on Mobile Devices", ECCV 2018 paper provided by the Computer Vision Foundation, 2018, pp. 1-17.

Liu et al., "Safe and Secure Wireless Power Transfer Networks: Challenges and Opportunities in RF-Based Systems", arXiv: 1601.05648v2 [cs.NI], Feb. 11, 2016, pp. 1-11.

Mell et al., "The NIST Definition of Cloud Computing", National Institute of Standards and Technology, Special Publication 800-145, Sep. 2011, pp. 1-7.

Wang et al., "AutoAI: Automating the End-To-End AI Lifecycle with Humans-in-the-Loop", IUI '20 Companion, Mar. 17-20, 2020, Cagliari, Italy, 2020, pp. 1-2.

Wang et al., "Human-AI Collaboration in Data Science: Exploring Data Scientists' Perceptions of Automasted AI", Proc. ACM Hum.-Comput. Interact., vol. 3, No. CSCW, Article 211. Publication date: Nov. 2019. pages 1-24.

Weidele et al., "AutoAIViz: Opening the Blackbox of Automated Artificial Intellegence with Conditional Parallel Coordinates", IUI '20, Mar. 17-20, 2020, Cagliari, Italy, pp. 1-5.

Delgado et al., "Simple Objectives Work Better*," RMSE Workshop, 13th ACM Conference on Recommender Systems (RecSys), Sep. 2019, https://ceur-ws.org/Vol-2440/paper5.pdf, 7 pages.

* cited by examiner

Algorithm 1 Operator splitting from ADMM to solve problem $$\{\theta^{c(t+1)}, \widetilde{\theta}^{d(t+1)}\} = \arg\min_{\theta^c, \widetilde{\theta}^d} \widetilde{f}\left(z^{(t)}, \{\theta^c, \widetilde{\theta}^d\}; \mathcal{A}\right) + I_C(\theta^c) + I_{\widetilde{D}}(\widetilde{\theta}^d) + (\rho/2)\left\|\widetilde{\theta}^d - b\right\|_2^2, \quad b := \delta^{(t)} - \frac{1}{\rho}\lambda^{(t)}, \quad (\theta\text{-min})$$

$$\delta^{(t+1)} = \arg\min_{\delta} I_{\mathcal{D}}(\delta) + (\rho/2)\|a - \delta\|_2^2, \quad a := \widetilde{\theta}^{d(t+1)} + (1/\rho)\lambda^{(t)}, \quad (\delta\text{-min})$$

$$z^{(t+1)} = \arg\min_{z} \widetilde{f}\left(z, \{\theta^{c(t+1)}, \widetilde{\theta}^{d(t+1)}\}; \mathcal{A}\right) + I_Z(z), \quad (z\text{-min})$$

where $(t)$ represents the iteration index, and the Lagrangian multipliers $\lambda$ are updated as $\lambda^{(t+1)} = \lambda^{(t)} + \rho(\widetilde{\theta}^{d(t+1)} - \delta^{(t+1)})$.

Algorithm 2 Operator splitting from ADMM to solve problem (with black-box constraints)

$$\{\theta^{c(t+1)}, \widetilde{\theta}^{d(t+1)}, \mathbf{u}^{(t+1)}\} = \arg\min_{\theta^c, \widetilde{\theta}^d, \mathbf{u}} \widetilde{f} + \frac{\rho}{2}\left\|\widetilde{\theta}^d - b\right\|_2^2 + I_C(\theta^c) + I_{\widetilde{D}}(\widetilde{\theta}^d) + I_{\mathcal{U}}(\mathbf{u}) + \frac{\rho}{2}\sum_{i=1}^{M}\left[\widetilde{g}_i + u_i - \epsilon_i + \frac{\mu_i(t)}{\rho}\right]^2,$$

$$\delta^{(t+1)} = \arg\min_{\delta} \frac{\rho}{2}\|\delta - a\|_2^2 + I_{\mathcal{D}}(\delta),$$

$$z^{(t+1)} = \arg\min_{z} \widetilde{f} + I_Z(z) + \frac{\rho}{2}\sum_{i=1}^{M}\left[\widetilde{g}_i - \epsilon_i + u_i^{(t+1)} + \frac{1}{\rho}\mu_i(t)\right]^2,$$

where the arguments of $\widetilde{f}$ and $\widetilde{g}_i$ are omitted for brevity, $a$ and $b$ have been defined in Algorithm 1, $\mathcal{U} = \{\mathbf{u} : \mathbf{u} = \{u_i\}\}$, and $\mu_i$ is the Lagrangian multiplier corresponding to the equality constraint $\widetilde{g}_i - \epsilon_i + u_i = 0$ in (14) and updated as $\mu_i^{(t+1)} = \mu_i^{(t)} + \rho(\widetilde{g}_i(z^{(t+1)}, \{\theta^{c(t+1)}, \widetilde{\theta}^{d(t+1)}\}; \mathcal{A}) - \epsilon_i + u_i^{(t+1)})$, for $i \in [M]$.

FIG. 6B

MACHINE LEARNING WITH MULTIPLE CONSTRAINTS

The Aspects of the present invention may have been disclosed by the inventor, or a joint inventor, in the disclosure arxiv.org:1905.00424v5 [cs.LG] made available to the public on Dec. 6, 2019. The Aspects of the present invention may have been disclosed by the inventor, or a joint inventor, in the disclosure "An ADMM Based Framework for AutoML Pipeline Configuration" made available to the public by way of presentation at the AAAI'20 conference on Feb. 10, 2020. The Aspects of the present invention may have been disclosed by the inventor, or a joint inventor, made available to the public by way of presentation at the AI Summit 2019 at New York City, NY on Dec. 11-12, 2019. The Aspects of the present invention may have been disclosed by the inventor, or a joint inventor, in the disclosure https://www.ibm.com/blogs/research/2020/04/ibm-research-iclr-2020-advancing-ai/made available to the public by way of presentation at the ICLR 2020 conference on Apr. 28, 2020. The Aspects of the present invention may have been disclosed by the inventor, or a joint inventor, in the disclosure "AutoAI with Multi-Stakeholder Constraints" that was part of the article "IBM Research AI at ICLR 2020: Advancing Trusted, Secure and Precision-Focused AI" made available to the public by way of presentation at the ICLR 2020 conference on Jul. 12, 2020. These aspects, as they may appear in the claims, may be subject to consideration under 35 U.S.C. § 102(b)(1)(A).

BACKGROUND

The exemplary embodiments relate generally to machine learning, and more particularly to machine learning with multiple constraints.

It can be very difficult for a person to determine which of many model pipelines to apply to data such that multiple constraints are satisfied. The person may need to consider a lot of information about the data and the many model pipelines to determine which one or more model pipelines satisfy the multiple constraints.

SUMMARY

The exemplary embodiments disclose a method, a computer program product, and a computer system for determining that one or more model pipelines satisfy one or more constraints. The exemplary embodiments may include detecting a user uploading data, one or more constraints, and one or more model pipelines, collecting the data, the one or more constraints, and the one or more model pipelines, and determining that one or more of the model pipelines satisfies all of the one or more constraints based on applying one or more algorithms to the collected data, constraints, and model pipelines.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which:

FIG. 6A depicts an exemplary ADMM-based joint optimization algorithm that does not consider constraints, in accordance with the exemplary embodiments.

FIG. 6B depicts an exemplary ADMM-based joint optimization algorithm that considers constraints, in accordance with the exemplary embodiments.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
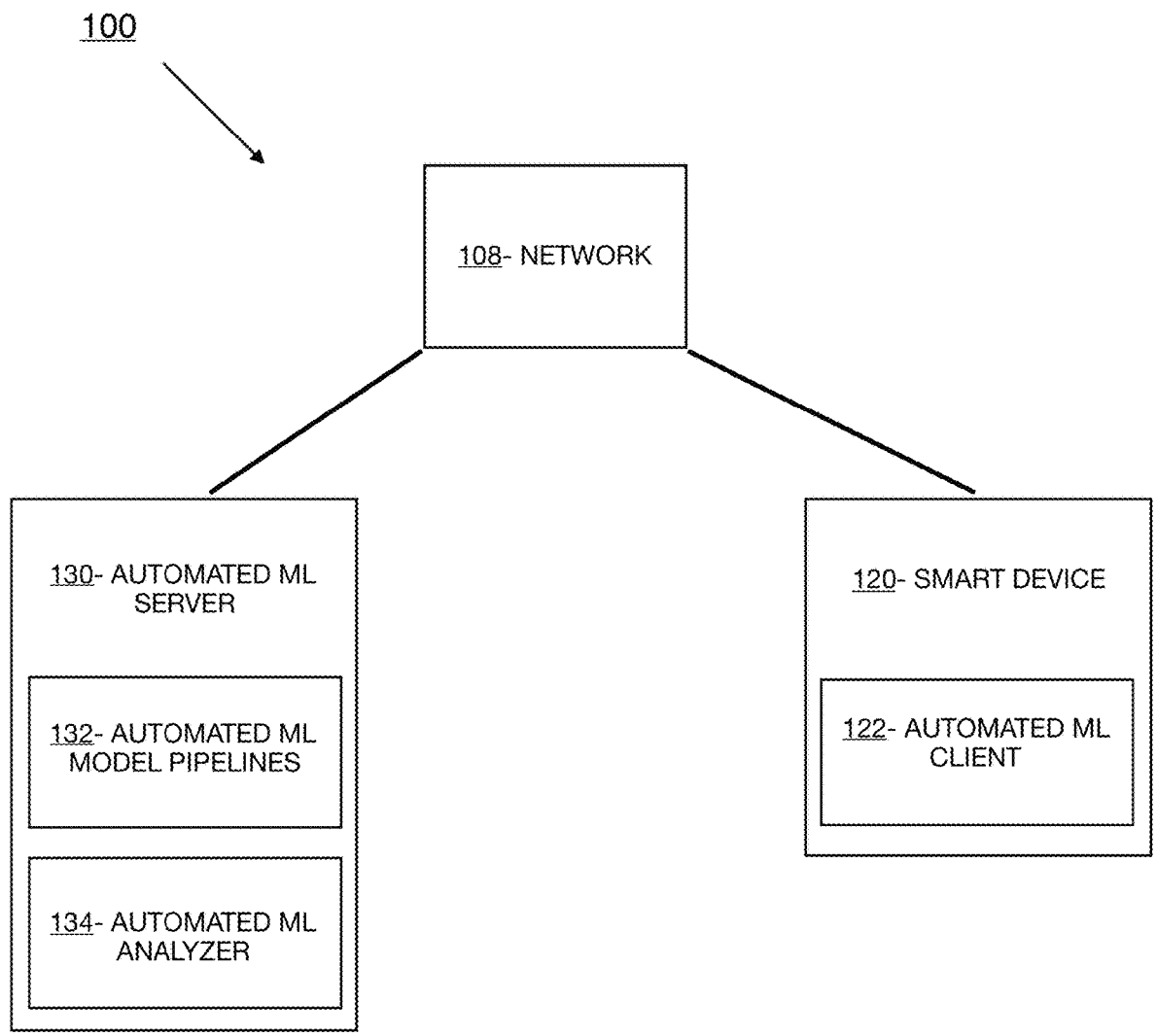
FIG. 1 depicts an exemplary schematic diagram of an automated machine learning (ML) system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

It can be very difficult for a person to determine which of many model pipelines to apply to data such that multiple constraints are satisfied. The person may need to consider a lot of information about the data and the many model pipelines to determine which one or more model pipelines satisfy the multiple constraints.

Exemplary embodiments are directed to a method, computer program product, and computer system for determining a model pipeline satisfies multiple constraints. In embodiments, machine learning may be used to create algorithms and/or model pipelines capable of satisfying multiple constraints, while feedback loops may improve upon such algorithms and/or model pipelines. In embodiments, constraints may include one or more of a maximum inference time, maximum false positive rate, maximum false negative rate, maximum memory overhead, maximum parity difference, maximum error rate difference, minimum area under a receiver operating characteristic curve (ROC, AUC), etc., and the one or more model pipelines that may satisfy the one or more constraints may include XGB (eXtreme Gradient Boosting) classifier models, extra trees classifier models, quadratic discriminant models, Gaussian Naive Bayes models, K nearest neighbors classifier models, etc. A user may wish to determine which one or more model pipelines satisfy multiple constraints for a number of reasons. For example, a user may wish to analyze a long list of credit card transactions to determine whether fraudulent activity occurred and wish to do so with a specified maximum false positive rate and false negative rate. In another example, a user may wish to identify interest rate trends over time and wish to do so with a specified maximum memory overhead and inference time. In general, it will be appreciated that embodiments described herein may relate to the determination that one or more model pipelines satisfy multiple constraints within any context and for any motivation.

FIG. 1 depicts the automated ML system 100, in accordance with the exemplary embodiments. According to the exemplary embodiments, the automated ML system 100 may include a smart device 120, and an automated ML server 130, which may be interconnected via a network 108.

While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the automated ML system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a Wi-Fi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices.

In the example embodiment, the smart device 120 includes an automated ML client 122 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an IoT device, or any other electronic device or computing system capable of receiving and sending data to and from other computing devices. While the smart device 120 is shown as a single device, in other embodiments, the smart device 120 may be comprised of a cluster or plurality of computing devices, in a modular manner, etc., working together or working independently. The smart device 120 is described in greater detail as a hardware implementation with reference to FIG. 10, as part of a cloud implementation with reference to FIG. 11, and/or as utilizing functional abstraction layers for processing with reference to FIG. 12.

The automated ML client 122 may be a software and/or hardware application capable of communicating with and providing a user interface for a user to interact with a server, for example the automated ML server 130, via the network 108. The automated ML client 122 may act as a client in a client-server relationship. Moreover, in the example embodiment, the automated ML client 122 may be capable of transferring data between the smart device 120 and other devices via the network 108. In embodiments, the automated ML analyzer 134 utilizes various wired and wireless connection protocols for data transmission and exchange, including Bluetooth, 2.4 gHz and 5 gHz internet, near-field communication, Z-Wave, Zigbee, etc. The automated ML client 122 is described in greater detail with respect to FIG. 2.

In the exemplary embodiments, the automated ML server 130 includes one or more automated ML model pipelines 132 and an automated ML analyzer 134. The automated ML server 130 may act as a server in a client-server relationship with the automated ML client 122, and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the automated ML server 130 is shown as a single device, in other embodiments, the automated ML server 130 may be comprised of a cluster or plurality of computing devices, working together or working independently. The automated ML server 130 is described in greater detail as a hardware implementation with reference to FIG. 10, as part of a cloud implementation with reference to FIG. 11, and/or as utilizing functional abstraction layers for processing with reference to FIG. 12.

The automated ML model pipelines 132 may be one or more algorithms, models, pipelines, etc. modelling a correlation between data and one or more classifications of the data. The automated ML model pipelines 132 may include XGB (eXtreme Gradient Boosting) classifier model pipelines, extra trees classifier model pipelines, quadratic discriminant model pipelines, Gaussian Naive Bayes model pipelines, K nearest neighbors classifier model pipelines, etc. In embodiments, the different automated ML model pipelines 132 may classify the same data with different inference times, false positive rates, false negative rates, memory overhead, parity difference, error rate difference, ROC, AUC, etc. In embodiments, the automated ML model pipelines 132 may be trained using machine learning methods, such as neural networks, deep learning, hierarchical learning, Gaussian Mixture modelling, Hidden Markov modelling, and K-Means, K-Medoids, or Fuzzy C-Means learning, etc. The automated ML model pipelines 132 are described in greater detail with reference to FIG. 2.

The automated ML analyzer 134 may be a software and/or hardware program capable of receiving a configuration of the automated ML system 100 and detecting a user uploading data and constraints. Moreover, the automated ML analyzer 134 may be further configured for collecting the data and constraints and applying one or more algorithms to the data and constraints to determine that one or more automated ML model pipelines 132 satisfy the constraints. The automated ML analyzer 134 is further capable of ranking the automated ML model pipelines 132 that satisfy the constraints, creating ensembles of the automated ML model pipelines 132, notifying the user of the determined one or more automated ML model pipelines, and applying the one or more automated ML model pipelines 132 to the collected data. Lastly, the automated ML analyzer 134 is capable of evaluating the determined automated ML model pipelines 132 and adjusting its models and/or algorithms based on the evaluation. The automated ML analyzer 134 is described in greater detail with reference to FIG. 2.

Figure 2:
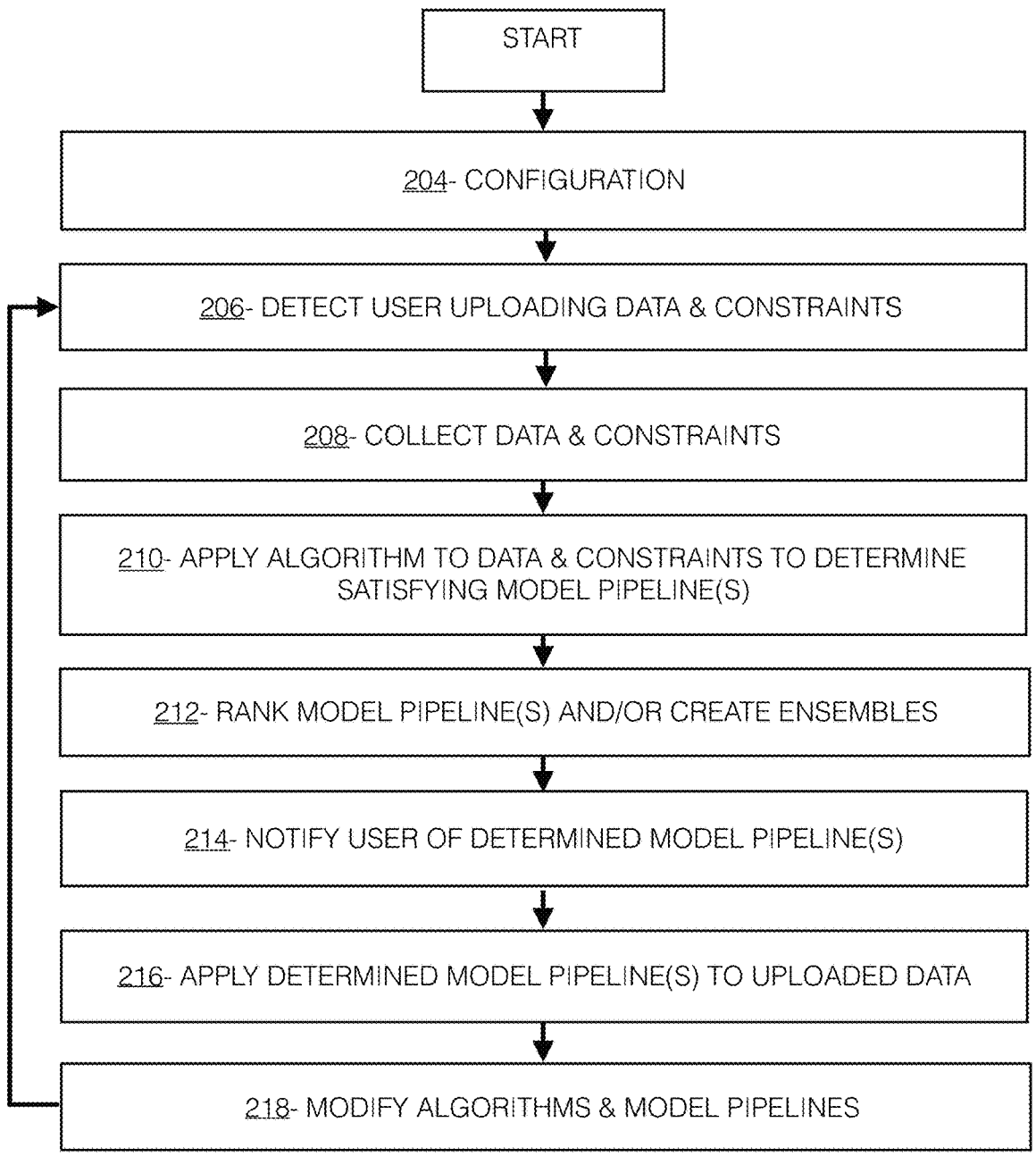
FIG. 2 depicts an exemplary flowchart illustrating the operations of an automated ML analyzer 134 of the automated ML system 100 in determining that one or more automated ML model pipelines 132 satisfy constraints, in accordance with the exemplary embodiments.

FIG. 2 depicts an exemplary flowchart illustrating the operations of an automated ML analyzer 134 of the automated ML system 100 in determining that one or more automated ML model pipelines 132 satisfy multiple constraints, in accordance with the exemplary embodiments.

The automated ML analyzer 134 may receive a configuration (step 204). The automated ML analyzer 134 may be configured by receiving information such as a user registration and user preferences. The user registration and user preferences may be uploaded by a user or administrator, i.e., the owner of the smart device 120 or the administrator of smart device 120. For example, the administrator may be an owner/user of the device, a guardian of a minor who uses the device, an employer of a phone-provided employee, etc. In the example embodiment, the configuration may be received by the automated ML analyzer 134 via the automated ML client 122 and the network 108. Receiving the user registration may involve receiving information such as a name, phone number, email address, account credentials (i.e., telephone account, video-chat/web conference, etc.), company name, serial number, smart device 120 type, and the like. Receiving a user registration may also involve receiving the location of or a link to databases such as a library of transformers and estimators, database of meta/transfer learners, etc. A library of transformers and estimators may include machine learning and artificial intelligence operators, and may be used to scale or analyze data. A database of meta/transfer learners may include previous experiments, problems, etc. that the automated ML analyzer 134 has solved, analyzed, categorized, etc.

During configuration, the automated ML analyzer 134 may further receive user preferences (step 204 continued). User preferences may include the manner in which the automated ML analyzer 134 should notify the user of one or more automated ML model pipelines 132 that satisfy constraints, for example, via user interface layout/display, text, audio, video, etc. User preferences may additionally include preferences as to whether a determined automated ML model pipeline 132 may be applied to data uploaded by the user without user input. For example, the automated ML analyzer 134 may be configured to automatically apply a determined automated ML model pipeline 132 to data uploaded by the user, or alternatively be configured to require user input to confirm an application of the determined automated ML model pipeline 132 to the data uploaded by the user.

Figure 3:
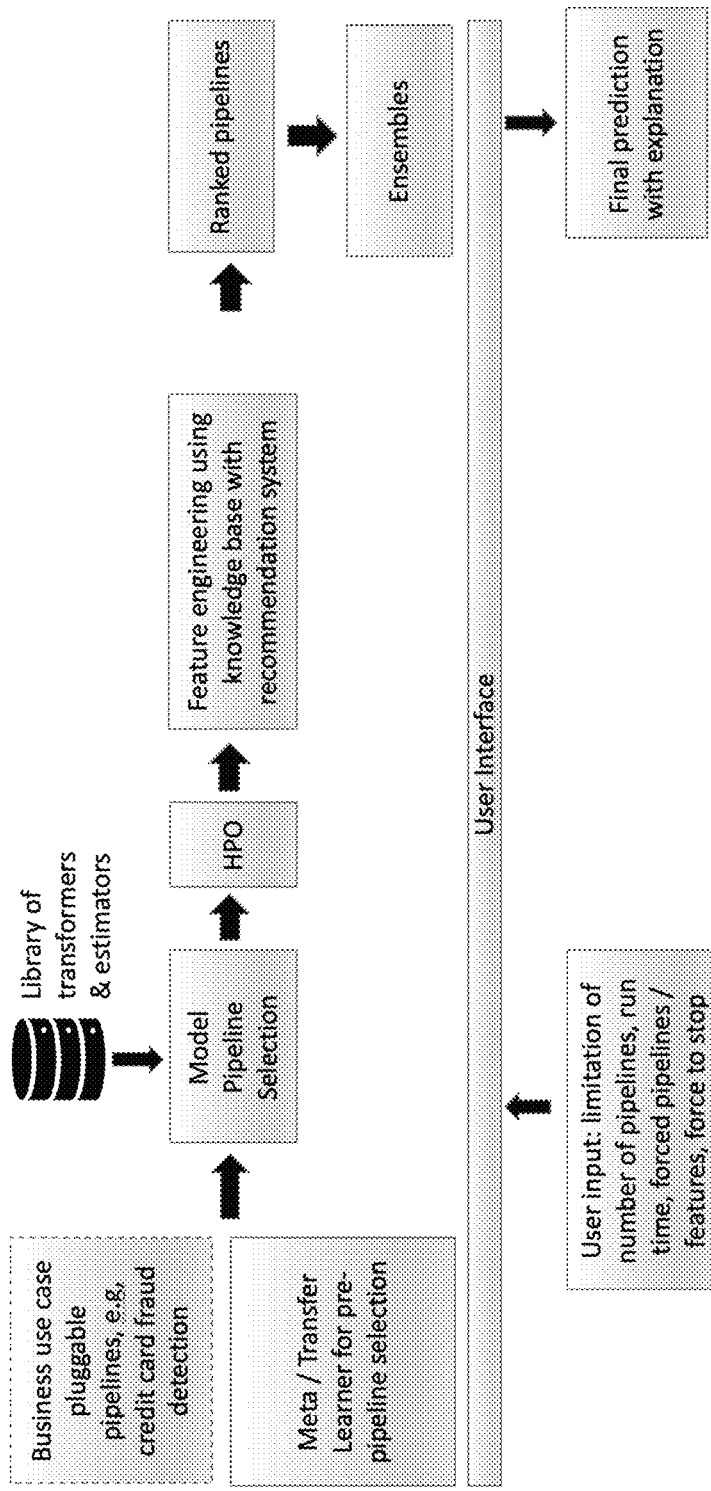
FIG. 3 depicts an exemplary flowchart illustrating the operations of the automated ML analyzer 134 of the automated ML system 100 in determining that one or more automated ML model pipelines 132 satisfy constraints, in accordance with the exemplary embodiments.
Figure 4:
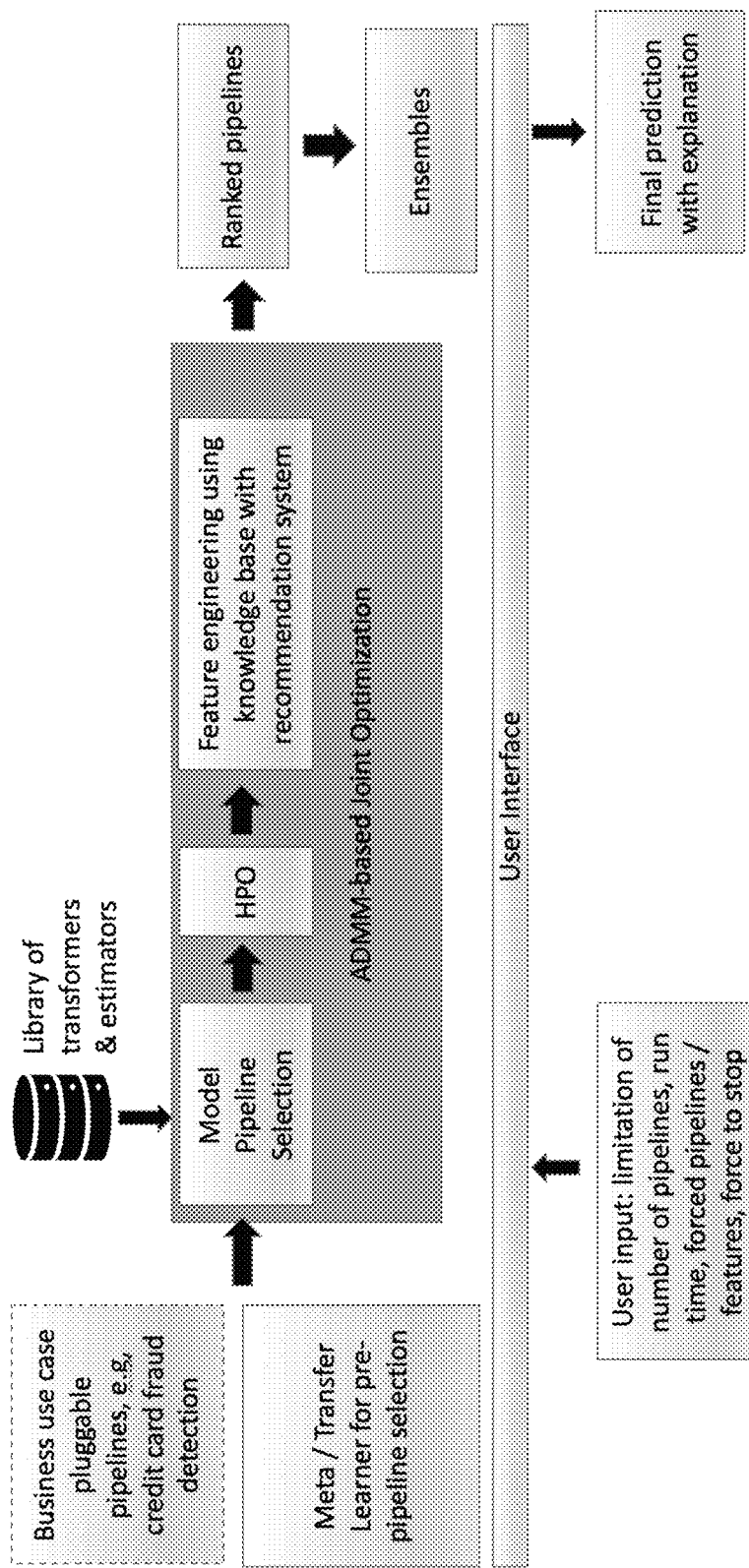
FIG. 4 depicts an exemplary flowchart illustrating the operations of the automated ML analyzer 134 of the automated ML system 100 in using an alternating direction method of multipliers (ADMM) based joint optimization approach to determine that one or more automated ML model pipelines 132 satisfy constraints, in accordance with the exemplary embodiments.

To further illustrate the operations of the automated ML analyzer 134, reference is now made to an illustrative example with reference to FIG. 3-4 where the user uploads a user registration for their computer as smart device 120 along with links to a library of transformers and estimators and to a meta/transfer learner. The user further uploads user preferences requesting notification of determined automated ML model pipelines 132 prior to applying the determined automated ML model pipelines 132 to data.

The automated ML analyzer 134 may detect a user uploading data and constraints (step 206). In embodiments, the automated ML analyzer 134 may detect a user uploading any data to be analyzed such as credit card transaction data to be analyzed for credit card fraud. The automated ML analyzer 134 may detect a user uploading constraints for the analysis of the uploaded data such as maximum inference time, false positive rate, false negative rate, memory overhead, parity difference, error rate difference, ROC, AUC, etc. In embodiments, the automated ML analyzer 134 may detect a user uploading data and constraints via integration and communication of the automated ML client 122 with the operating system of the smart device 120. In embodiments, the user may upload data and constraints via a user interface.

Figure 8:
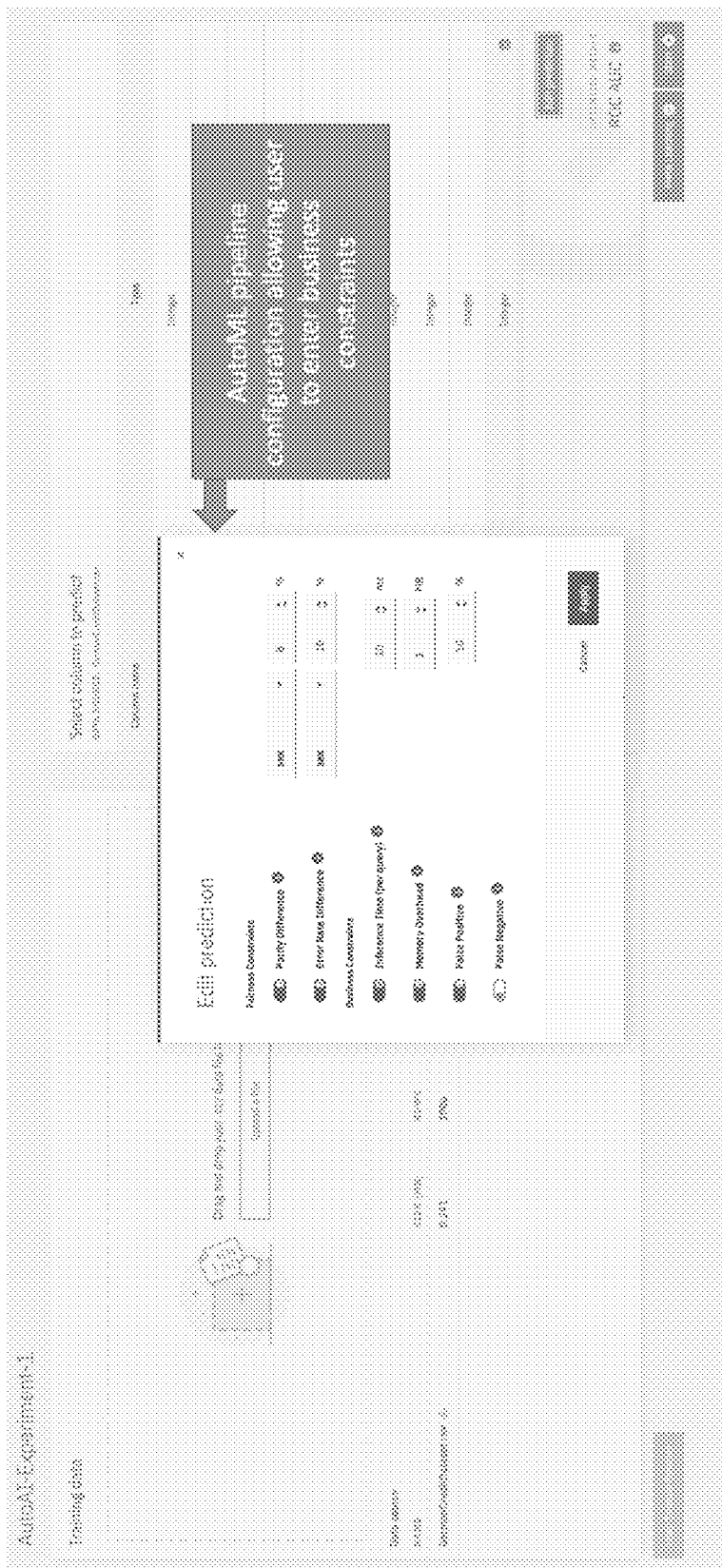
FIG. 8 depicts an exemplary illustration of a user interface that allows a user to input multiple constraints, in accordance with the exemplary embodiments.

With reference again to the previously introduced example where the automated ML analyzer 134 receives a configuration, and additionally with reference to FIG. 8, the automated ML analyzer 134 detects the user uploading credit card transaction data and constraints for analyzing the data via a user interface.

Upon detecting the user uploading data and constraints, the automated ML analyzer 134 may proceed to collect the data and constraints (step 208). The automated ML analyzer 134 may collect the data uploaded by the user to be analyzed, data of a library of transformers and estimators, and/or data of a meta/transfer learner. This data may be collected from one or more hard drives of the smart device 120 or the network 108 previously or in real time and may include hyperparameter values as well as XGB (extreme Gradient Boosting) classifier model pipelines, extra trees classifier model pipelines, quadratic discriminant analysis model pipelines, Gaussian Naive Bayes model pipelines, and K nearest neighbors classifier model pipelines. The automated ML analyzer 134 may additionally collect constraints uploaded by the user such as one or more of a maximum inference time, false positive rate, false negative rate, memory overhead, parity difference, error rate difference, ROC, AUC, etc. The constraints may be collected from a user interface.

With reference again to the previously introduced example where the automated ML analyzer 134 detects the user uploading credit card transaction data and constraints for analyzing the data via a user interface, and additionally with reference to FIG. 3, FIG. 4, and FIG. 8, the automated ML analyzer 134 collects the credit card transaction data, meta/transfer learner data, and transformers and estimators data including XGB classifier model pipelines, extra trees classifier model pipelines, quadratic discriminant analysis model pipelines, Gaussian Naive Bayes model pipelines, and K neighbors classifier model pipelines (labeled P1-P25). The automated ML analyzer 134 additionally collects the maximum constraint values listed in Table 1.

TABLE 1

| Parity Difference | 8% |
|---|---|
| Error Rate Difference | 10% |
| Inference Time (per query) | 10% |
| Memory Overhead | 1 MB |
| False Positive Rate | 10% |

Figure 5:
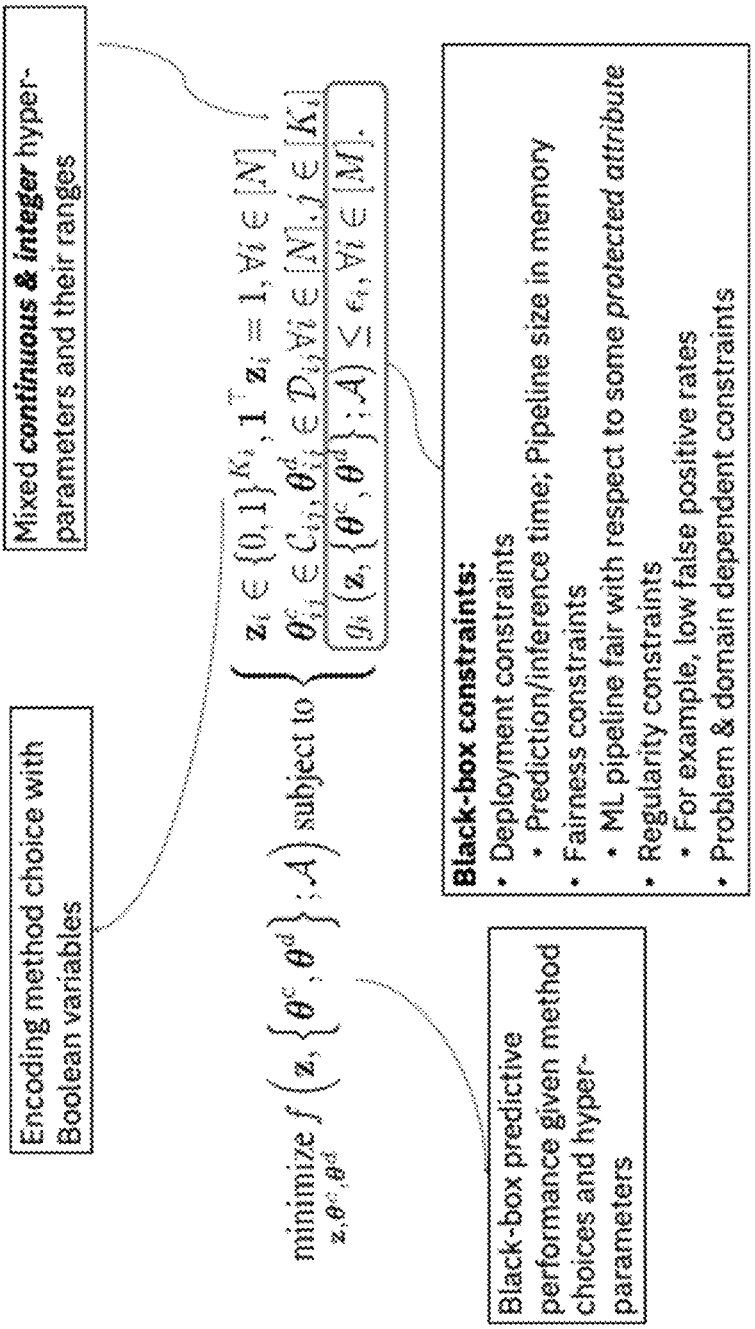
FIG. 5 depicts a joint optimization problem that the automated ML analyzer 134 of the automated ML system 100 may solve, in accordance with the exemplary embodiments.

The automated ML analyzer 134 may apply one or more algorithms to the data and constraints in order to determine that one or more automated ML model pipelines 132 satisfy the specified constraints (step 210). In embodiments, the automated ML analyzer 134 may apply one or more algorithms to the data and constraints to solve the mathematical problem expressed in FIG. 5. With reference to FIG. 5, "$z_i$" represents an automated ML model pipeline 132 choice, encoded with Boolean variables. "$\theta^c$" and "$\theta^d$" represent continuous and discrete hyperparameter configurations respectively, which are defined for each possible automated ML model pipeline 132 "i" and each possible hyperparameter value "j" according to their ranges. Any instance of a pipeline configuration is given by choices of "$z_i$", "$\theta^c_{ij}$", and "$\theta^d_{ij}$". Given this configuration, "f" is a black-box optimization objective corresponding to the predictive performance of the analysis of the uploaded data ("A"). Similar to "f", the "$g_i$" functions are functions of the pipeline configuration and the uploaded data, and correspond to quantities (such as inference time, algorithmic bias, etc.) on which the user specifies constraints with thresholds ($\varepsilon_i$). Solving the mathematical problem of FIG. 5 results in the selection of one or more automated ML model pipelines 132 that satisfy one or more hyperparameters and constraints in analyzing the uploaded data by considering the different automated ML model pipelines 132 (method choices of FIG. 5), hyperparameters, and constraints.

In embodiments, the automated ML analyzer 134 may utilize an alternating direction method of multipliers (ADMM) based joint optimization approach such as one or more of the algorithms illustrated in FIG. 6A and FIG. 6B to solve the mathematical problem depicted in FIG. 5 in order to determine which automated ML model pipelines 132 satisfy the specified constraints (step 210 continued). With reference to FIG. 6A and FIG. 6B, "z" represents an automated ML model pipeline 132 choice, encoded with Boolean variables. "$\theta^{d^c}$" corresponds to the continuous relaxation of integer hyperparameters, and "δ" corresponds to the integer hyperparameters. "λ" measures the gap between the integer hyperparameters and their continuous relaxations, and is used to ensure that this gap is small. With reference to FIG. 6B, "$v_i$" and "$\mu_i$" account for constraints corresponding to "$g_i$" and "$\varepsilon_i$" and serve the role of adaptively penalizing their corresponding constraint violations, if any.

In embodiments, the automated ML analyzer 134 may utilize the algorithm of FIG. 6A to solve the mathematical problem of FIG. 5 and determine which automated ML model pipelines 132 satisfy the specified constraints (step 210 continued). The algorithm of FIG. 6A decomposes the problem shown in FIG. 5 with a large number of continuous, integer, and choice variables into three smaller sub-problems that can be solved more easily but require iteration to be solved. The algorithm of FIG. 6A corresponds to these three smaller sub-problems. The "θ-min" problem (first line) corresponds to a problem with a very small number of only continuous variables with standard techniques such as Bayesian Optimization with Gaussian Processes. This problem is equivalent to HPO (hyperparameter optimization) for some fixed choice of algorithms. The "δ-min" problem (second line) ensures the proper handling of integer hyperparameters with a close form integer projection operation. The "z-min" problem (third line) is an integer programming problem corresponding to the choice of algorithms for fixed hyperparameters and can be solved with techniques such as combinatorial multi-armed bandits. The "λ" variables ensure that the gap between the integer hyperparameters and their continuous relaxations stay small. The "p" variable is a design choice that quantifies how severely the aforementioned gap is penalized. To solve the mathematical problem of FIG. 5, the above three problems are solved iteratively until some convergence criteria is reached or until the time allocated to this optimization has expired. By iterating the above steps, the automated ML analyzer 134 may determine multiple automated ML model pipelines 132 that satisfy hyperparameters and may satisfy the specified constraints. In embodiments, the automated ML analyzer 134 may subsequently filter automated ML model pipelines 132 based on their meeting or failing to meet specified constraints.

In embodiments, the automated ML analyzer 134 may utilize the algorithm of FIG. 6B to solve the mathematical problem of FIG. 5 and determine which automated ML model pipelines 132 satisfy the specified constraints (step 210 continued). The algorithm of FIG. 6B operates in a similar iterative manner as the algorithm of FIG. 6A. The main differences are the introduction of variables "$v_i$" and "$\mu_i$" to account for the constraints corresponding to "$g_i$" and "$\varepsilon_i$", and the additional terms in the "θ-min" problem (first line) and "z-min" problem (third line) which correspond to aggregate constraint violations across all of the constraints. The "θ-min" step (first line) and "z-min" step now solve an unconstrained problem which adds a penalty term (for constraint violations) to the original objective "f". The "$v_i$" and "$\mu_i$" variables are modified to adaptively penalize different constraints at different stages of the algorithm based on how easy or difficult these constraints are to satisfy. Variable "p" (still a fixed design choice) also plays the role of quantifying the penalty on the constraint violations aggregated over all the constraints. The "$v_i$" and "$\mu_i$" variables drive how significantly individual constraints are penalized in an adaptive manner at different stages of the optimization. By iterating the three steps of the algorithm of FIG. 6B, the automated ML analyzer 134 may determine multiple automated ML model pipelines 132 that satisfy hyperparameters and constraints.

In embodiments, the automated ML analyzer 134 may utilize algorithms and/or approaches that are not ADMM-based joint optimization approaches to solve the mathematical problem of FIG. 5 and determine which automated ML model pipelines 132 satisfy the specified constraints (step 210 continued). In embodiments, and with reference to FIG. 3, the automated ML analyzer 134 may require additional steps for HPO (hyperparameter optimization) and feature engineering when not utilizing an ADMM-based joint optimization approach.

Figure 7:
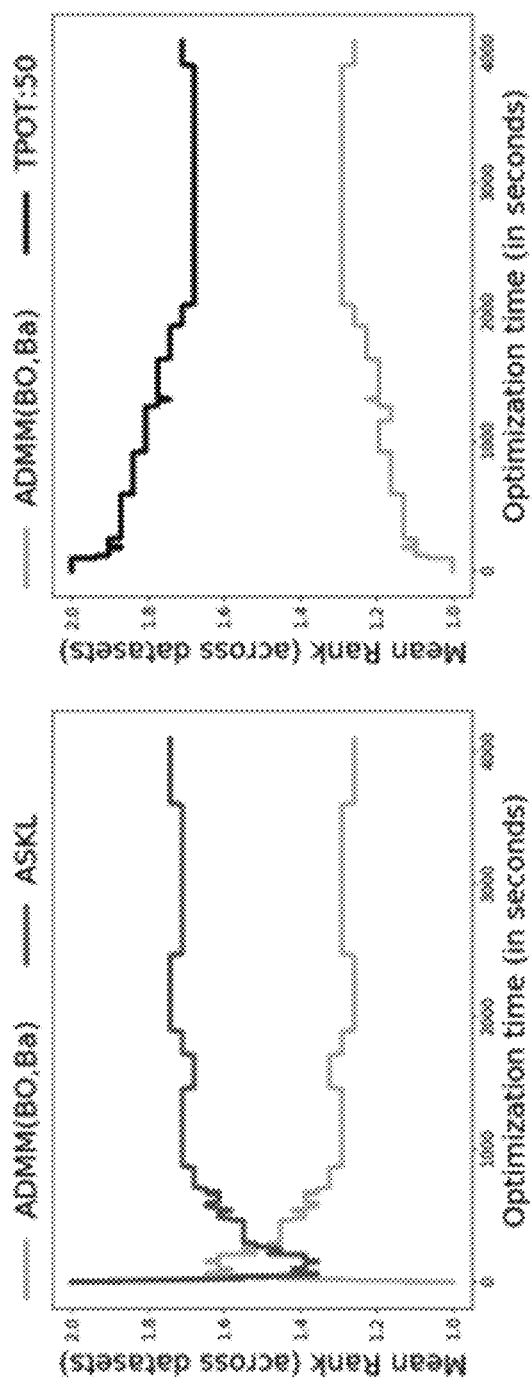
FIG. 7 depicts graphs comparing mean rank (aggregated over performance on thirty data sets) across optimization times for an ADMM-based joint optimization algorithm, Auto-sklearn (ASKL), and Tree-based Pipeline Optimization Tool (TPOT) with a population of 50, in accordance with the exemplary embodiments.

In embodiments, the automated ML analyzer 134 may achieve better performance in determining which automated ML model pipelines 132 satisfy hyperparameters and constraints by analyzing data with ADMM-based joint optimization approaches (step 210 continued). With reference to FIG. 7, when the automated ML analyzer 134 analyzes uploaded data with the algorithm of FIG. 6A, it achieves better mean rank values than Auto-sklearn approaches (ASKL) and Tree-based Pipeline Optimization Tool (TPOT) approaches (with a population of 50), especially as optimization time increases.

With reference to the previously introduced example where the automated ML analyzer 134 collects the credit card transaction data, meta/transfer learner data, transformers and estimators data, and constraint values, and with additional reference to FIG. 6B, the automated ML analyzer 134 applies the algorithm of FIG. 6B to the collected data to determine that XGB classifier model pipelines P1 and P5 and Gaussian Naive Bayes model pipelines P13, P15, and P18 satisfy the specified constraints.

Upon determining that one or more automated ML model pipelines 132 satisfy the specified constraints, the automated ML analyzer 134 may rank the automated ML model pipelines 132 and create one or more ensembles (step 212). With reference to FIG. 3-4, when one or more automated ML model pipelines 132 satisfy the specified constraints, the automated ML analyzer 134 may rank the automated ML model pipelines 132 according to how well they satisfy the specified constraints. In embodiments, the automated ML analyzer 134 may determine that an automated ML model pipeline 132 that satisfies the specified constraints by a wide margin or threshold is ranked higher than an automated ML model pipeline 132 that satisfies the specified constraints by a slim margin or threshold. In embodiments, the user may specify that one or more constraints are of a higher priority than other constraints, and the automated ML analyzer 134 may determine that an automated ML model pipeline 132 that satisfies the higher priority constraints by a wide margin or threshold is ranked higher than an automated ML model pipeline 132 that satisfies the higher priority constraints by a slim margin or threshold. In embodiments, and with reference to FIG. 9, the automated ML analyzer 134 may rank automated ML model pipelines 132 according to maximizing the constraint of area under a receiver operating characteristic curve (ROC AUC). In embodiments, and with reference to FIG. 9, the user may be able to interact with a user interface to rank the automated ML model pipelines 132 according to how well they satisfy a certain constraint. In embodiments where the automated ML analyzer 134 determines that only one automated ML model pipeline 132 satisfies the specified constraints, the automated ML analyzer 134 may assign the one automated ML model pipeline 132 the highest rank.

In embodiments, the automated ML analyzer 134 may further create one or more ensembles of automated ML model pipelines 132 (step 212 continued). In embodiments where the automated ML analyzer 134 determines that two or more automated ML model pipelines 132 satisfy the constraints and that the two or more automated ML model pipelines 132 have different advantages in analyzing and/or modeling the collected data, the automated ML analyzer 134 may determine that an ensemble of the two or more automated ML model pipelines 132 should be applied to the data in parallel. For example, if an XGB classifier model pipeline meets the constraints specified by the user and handles data better with respect to false positives, and a Gaussian Naive Bayes model pipeline also meets the constraints specified by the user and handles data better with respect to false negatives, the automated ML analyzer 134 may determine that the XGB classifier model pipeline and Gaussian Naive Bayes model pipeline should be grouped into an ensemble to be applied to the data.

Figure 9:
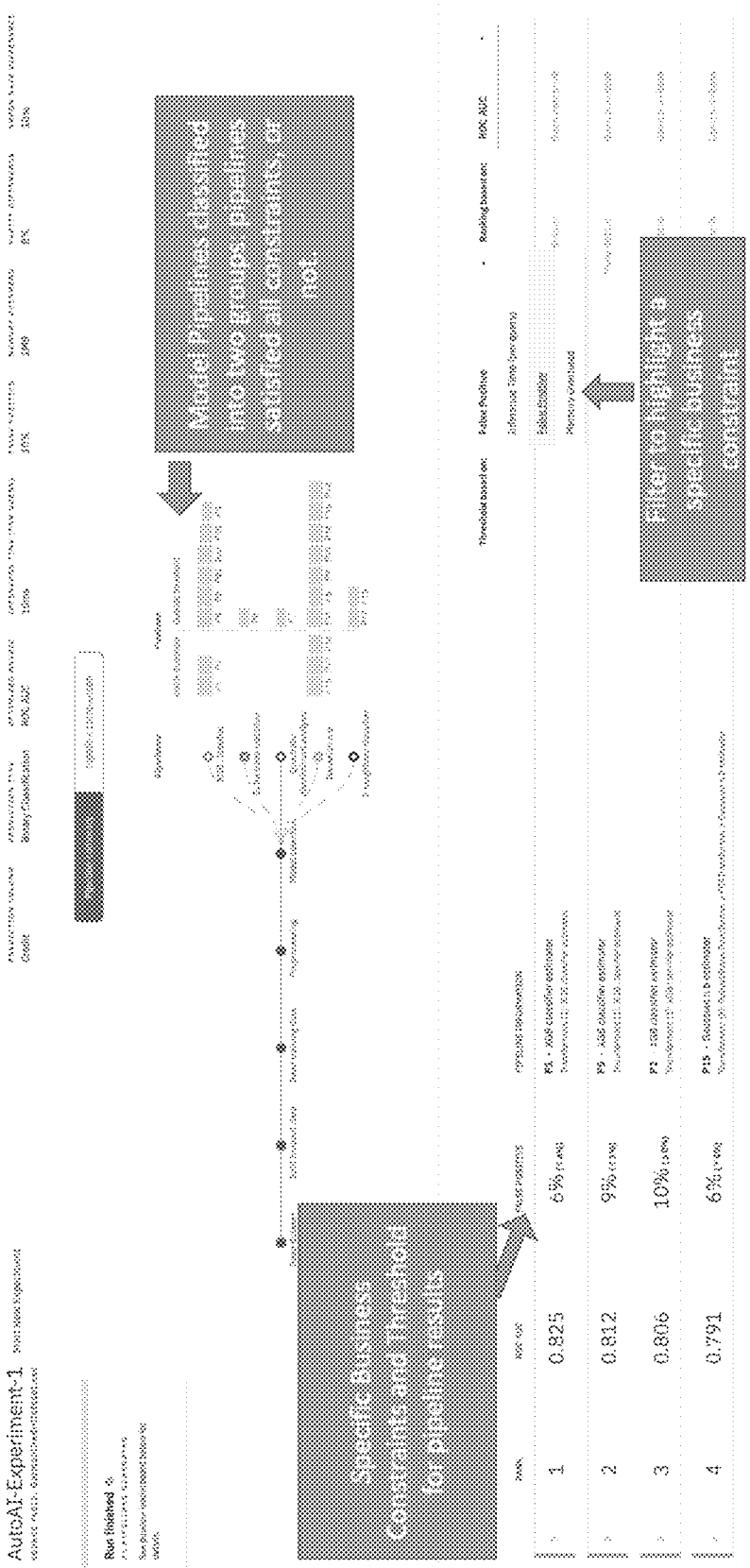
FIG. 9 depicts an exemplary illustration of a user interface that displays one or more automated ML model pipelines 132 satisfying the multiple constraints, in accordance with the exemplary embodiments.

With reference to the example above where the automated ML analyzer 134 applies the algorithm of FIG. 6B to the collected data to determine that XGB (eXtreme Gradient Boosting) classifier model pipelines P1 and P5 and Gaussian Naive Bayes model pipelines P13, P15, and P18 satisfy the specified constraints, and additionally with reference to FIG. 9, the automated ML analyzer 134 ranks the automated ML model pipelines 132 in order to maximize ROC, AUC. Automated ML model pipeline P1 has the highest rank with respect to ROC, AUC, and satisfies all of the specified constraints.

The automated ML analyzer 134 may notify the user of the automated ML model pipelines 132 that satisfy the constraints (step 214). A notification or suggestion to the user may be in the form of audio, video, text, etc. and may convey information to the user in any manner. In embodiments, the automated ML analyzer 134 may notify the user of the automated ML model pipelines 132 via a user interface such as the user interface depicted in FIG. 9, and the user interface may display one or more ranks, graphs, constraints, thresholds, etc. of one or more automated ML model pipelines 132. The user may further be capable of interacting with the user interface, for example to sort automated ML model pipelines 132 based on a specific constraint. In embodiments, the automated ML analyzer 134 may be configured to apply an automated ML model pipeline 132 that satisfies the constraints to the uploaded data without first notifying or suggesting the automated ML model pipeline 132 to the user.

With reference again to the previously introduced example where the automated ML analyzer 134 ranks the automated ML model pipelines 132 in order to maximize ROC AUC, and additionally with reference to FIG. 9, the automated ML analyzer 134 notifies the user via the user interface of FIG. 9 on their computer screen with a graph of automated ML model pipelines 132 that satisfy the constraints, and a ranking of automated ML model pipelines with respect to ROC AUC.

The automated ML analyzer 134 may apply one or more determined automated ML model pipelines 132 to the uploaded data (step 216). In embodiments, the user may select one or more automated ML model pipelines 132 to apply to the uploaded data. In other embodiments, the automated ML analyzer 134 may apply the highest ranked automated ML model pipeline 132 to the uploaded data. The application of one or more automated ML model pipelines 132 to the uploaded data may result in one or more conclusions, summaries, categorizations, etc. of the uploaded data.

With reference again to the previously introduced example where the automated ML analyzer 134 notifies the user via the user interface of FIG. 9 on their computer screen with a graph and ranking of automated ML model pipelines 132 that satisfy the constraints, the automated ML analyzer 134 applies P1 (the highest ranked automated ML model pipeline 132 with respect to ROC AUC that also satisfies all constraints) to the credit card transaction data to determine that credit card fraud occurred.

The automated ML analyzer 134 may evaluate and modify the algorithms and/or model pipelines (step 218). In the example embodiment, the automated ML analyzer 134 may verify whether the determined automated ML model pipelines 132 satisfied the specified constraints and/or were appropriately ranked in order to provide a feedback loop for modifying one or more algorithms and/or automated ML model pipelines 132. The automated ML analyzer 134 may additionally verify whether the applied automated ML model pipeline 132 analyzed, classified, categorized, etc. the uploaded data appropriately according to the specified constraints, and update the automated ML model pipelines 132 accordingly. In embodiments, the feedback loop may simply provide a means for a user to indicate whether the determined automated ML model pipelines 132 in fact satisfied the constraints. For example, the automated ML analyzer 134 may prompt a user to select an option indicative of whether the automated ML analyzer 134 satisfied the constraints. The option may comprise a toggle switch, button, slider, etc. that may be selected by the user manually by hand using a button/touchscreen/etc., by voice, by eye movement, and the like. Based on the automated ML analyzer 134 appropriately or inappropriately determining that one or more automated ML model pipelines 132 satisfy the constraints, the automated ML analyzer 134 may modify the algorithms and/or automated ML model pipelines 132. In other embodiments, the automated ML analyzer 134 may infer or deduce whether the determined automated ML model pipelines 132 adequately satisfied the constraints, for example if the user immediately applies a different automated ML model pipeline 132 to the uploaded data. In some embodiments, the automated ML analyzer 134 may interpret user dialogue via natural language processing to determine whether the determined automated ML model pipelines 132 adequately satisfied the constraints. For example, if the user says, "That didn't satisfy all constraints" or other expressions indicative of a user's dissatisfaction, the automated ML analyzer 134 may infer that the constraints were not adequately satisfied and modify the algorithms and/or automated ML model pipelines 132 accordingly. Based on feedback received in the above or any other manners, the automated ML analyzer 134 may then modify the algorithms and/or automated ML model pipelines 132 to more accurately determine which automated ML model pipelines 132 satisfy constraints.

With reference again to the previously introduced example where the automated ML analyzer 134 applies P1 to the credit card transaction data to determine that credit card fraud occurred, the user says, "Thank you, that worked" and the automated ML analyzer 134 adjusts the algorithm accordingly.

FIG. 3 depicts an exemplary flowchart illustrating the operations of the automated ML analyzer 134 of the automated ML system 100 in determining that one or more automated ML model pipelines 132 satisfy constraints, in accordance with the exemplary embodiments.

FIG. 4 depicts an exemplary flowchart illustrating the operations of the automated ML analyzer 134 of the automated ML system 100 in using an alternating direction method of multipliers (ADMM) based joint optimization approach to determine that one or more automated ML model pipelines 132 satisfy constraints, in accordance with the exemplary embodiments.

FIG. 5 depicts a joint optimization problem that the automated ML analyzer 134 of the automated ML system 100 may solve, in accordance with the exemplary embodiments.

FIG. 6A depicts an exemplary ADMM-based joint optimization algorithm that does not consider constraints, in accordance with the exemplary embodiments.

FIG. 6B depicts an exemplary ADMM-based joint optimization algorithm that considers constraints, in accordance with the exemplary embodiments.

FIG. 7 depicts graphs comparing mean rank (aggregated over performance on thirty data sets) across optimization times for an ADMM-based joint optimization algorithm, Auto-sklearn (ASKL), and Tree-based Pipeline Optimization Tool (TPOT) with a population of 50, in accordance with the exemplary embodiments.

FIG. 8 depicts an exemplary illustration of a user interface that allows a user to input multiple constraints, in accordance with the exemplary embodiments.

FIG. 9 depicts an exemplary illustration of a user interface that displays one or more automated ML model pipelines 132 satisfying the multiple constraints, in accordance with the exemplary embodiments.

Figure 10:
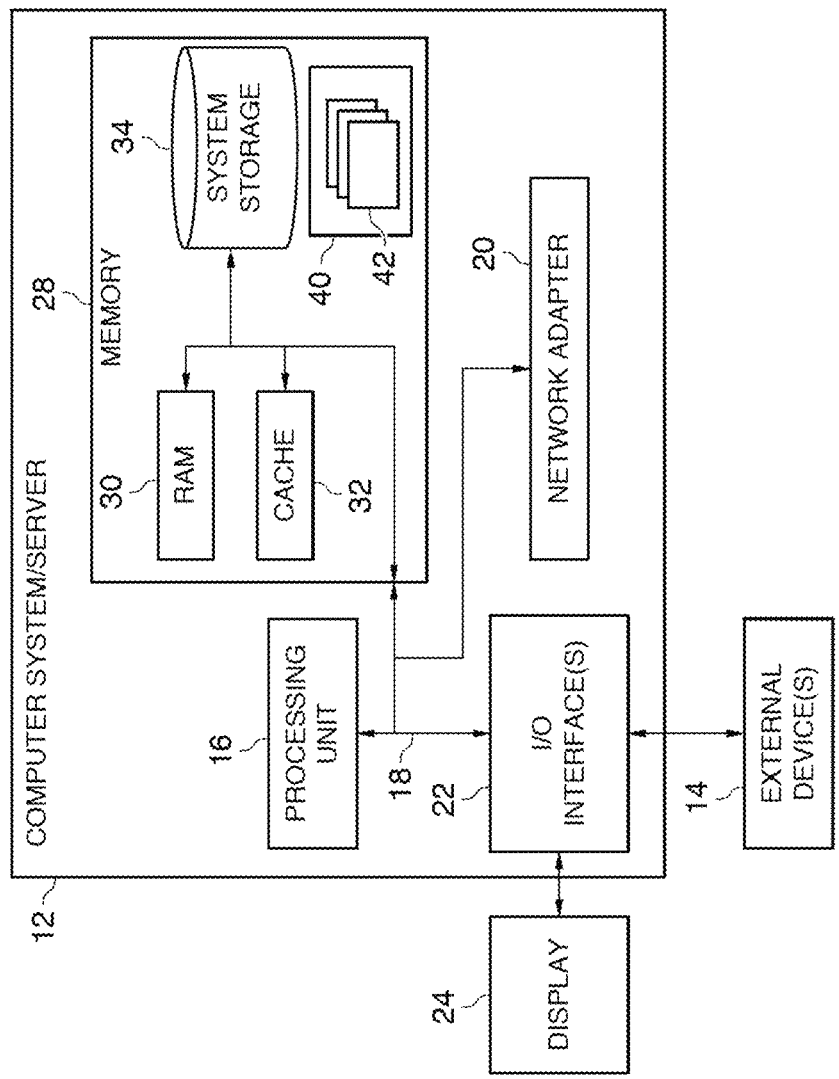
FIG. 10 depicts an exemplary block diagram depicting the hardware components of the automated ML system 100 of FIG. 1, in accordance with the exemplary embodiments.

FIG. 10 depicts a block diagram of devices within the automated ML analyzer 134 of the automated ML system 100 of FIG. 1, in accordance with the exemplary embodiments. It should be appreciated that FIG. 10 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
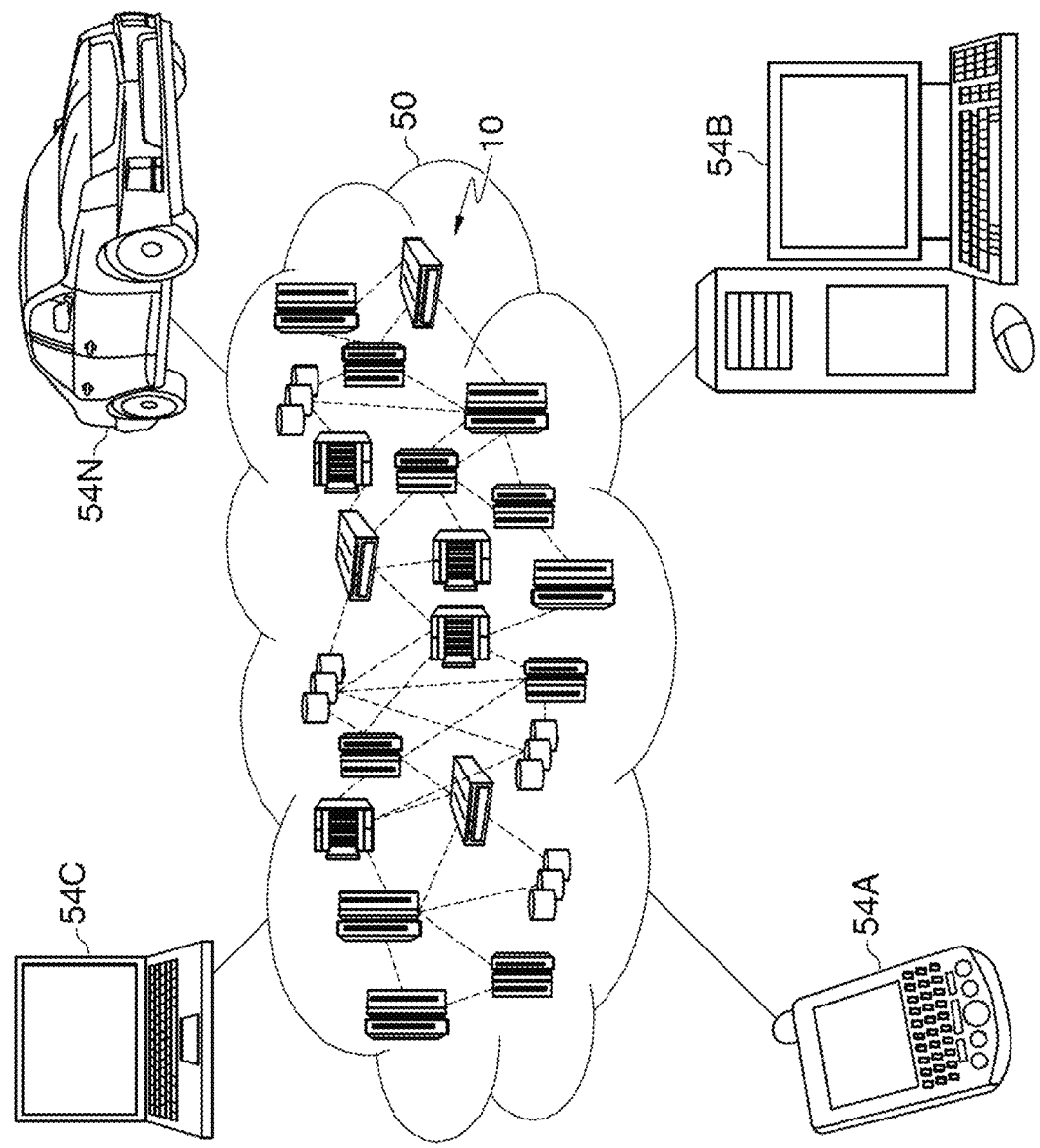
FIG. 11 depicts a cloud computing environment, in accordance with the exemplary embodiments.

Referring now to FIG. 11, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 40 and cloud computing environment 50 can communicate with any type of computerized device over any type of network and/or network addressable connection (e.g., using a web browser).

Figure 12:
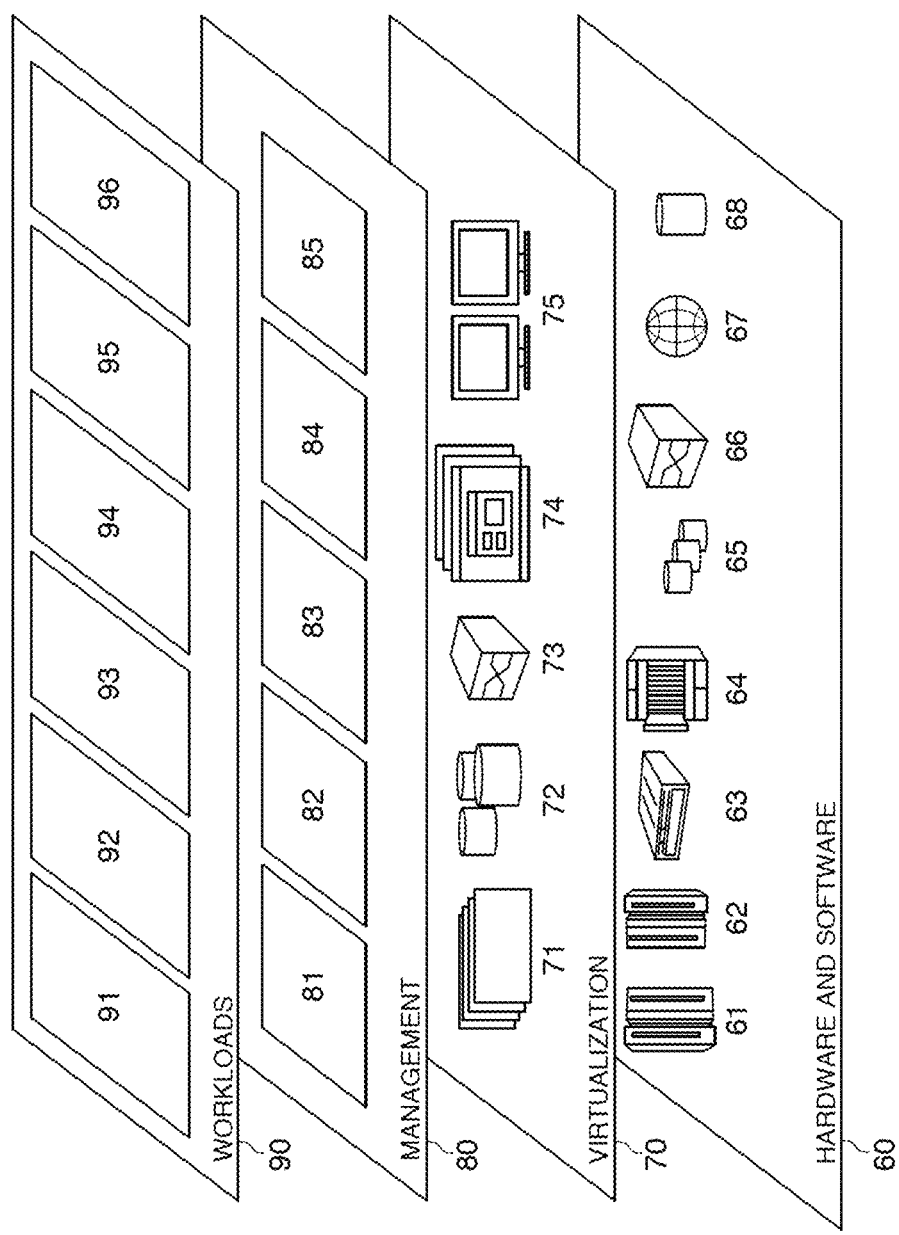
FIG. 12 depicts abstraction model layers, in accordance with the exemplary embodiments.

Referring now to FIG. 12, a set of functional abstraction layers provided by cloud computing environment 50 (FIG. 11) is shown. It should be understood in advance that the components, layers, and functions shown in FIG. 12 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and constraint satisfaction 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    detecting a user uploading data and one or more constraints;
    collecting the data and the one or more constraints; and
    determining that one or more model pipelines satisfies all of the one or more constraints based on applying one or more algorithms to the collected data, the collected constraints, and to multiple model pipelines, wherein the one or more algorithms use an alternating direction method of multipliers (ADMM) based joint optimization approach in determining that one or more of the model pipelines satisfies all of the one or more constraints, and the ADMM based joint optimization approach decomposes the determining into sub-problems solved iteratively, the sub-problems comprising:
        one or more hyperparameter problems solving hyperparameter optimization for the one or more model pipelines, and
        a pipeline selection problem solved by a combinatorial multi-armed bandit algorithm,
    wherein the ADMM based joint optimization approach uses explicit Boolean variables to encode selection of the multiple model pipelines.

2. The method of claim 1, further comprising:
    applying the determined one or more model pipelines to the collected data.

3. The method of claim 2, further comprising:
    notifying the user of the determined one or more model pipelines before applying the determined one or more model pipelines to the collected data.

4. The method of claim 1, wherein:
    the one or more algorithms re-optimize the one or more hyperparameters based on the selected model pipelines.

5. The method of claim 1, further comprising:
    receiving feedback indicative of whether the determined one or more model pipelines appropriately satisfied all of the constraints; and
    adjusting the one or more algorithms based on the received feedback.

6. The method of claim 1, wherein:
    the one or more constraints include constraints selected from a group consisting of a maximum inference time, maximum false positive rate, maximum false negative rate, maximum memory overhead, maximum parity difference, maximum error rate difference, and minimum area under a receiver operating characteristic curve; and
    the one or more model pipelines include model pipelines selected from a group consisting of eXtreme Gradient Boosting classifier models, extra trees classifier models, quadratic discriminant models, Gaussian Naive Bayes models, and K nearest neighbors classifier models.

7. The method of claim 1, wherein the determining determines that more than one of the model pipelines satisfies all of the one or more constraints; and
    wherein the method further comprises applying each of the determined more than one model pipelines to the collected data in parallel.

8. The method of claim 1, wherein the determining comprises the one or more algorithms decomposing an analysis to three smaller problems that are solved iteratively.

9. The method of claim 1, wherein the ADMM based joint optimization approach implements variables to adaptively penalize constraint violations at different stages of the one or more algorithms.

10. A computer program product comprising:
one or more non-transitory computer-readable storage media and program instructions stored on the one or more non-transitory computer-readable storage media capable of performing a method, the method comprising:
detecting a user uploading data and one or more constraints;
collecting the data and the one or more constraints; and
determining that one or more model pipelines satisfies all of the one or more constraints based on applying one or more algorithms to the collected data, the collected constraints, and multiple model pipelines, wherein the one or more algorithms use an alternating direction method of multipliers (ADMM) based joint optimization approach in determining that one or more of the model pipelines satisfies all of the one or more constraints, and the ADMM based joint optimization approach differentiates continuous and discrete hyperparameter configurations defined for the multiple model pipelines.

11. The computer program product of claim 10, further comprising:
applying the determined one or more model pipelines to the collected data.

12. The computer program product of claim 11, further comprising:
notifying the user of the determined one or more model pipelines before applying the determined one or more model pipelines to the collected data.

13. The computer program product of claim 10, wherein:
the one or more algorithms optimize one or more hyperparameters and select model pipelines based on the one or more hyperparameters; and
the one or more algorithms re-optimize the one or more hyperparameters based on the selected model pipelines.

14. The computer program product of claim 10, further comprising:
receiving feedback indicative of whether the determined one or more model pipelines appropriately satisfied all of the constraints; and
adjusting the one or more algorithms based on the received feedback.

15. The computer program product of claim 10, wherein:
the one or more constraints include constraints selected from a group consisting of a maximum inference time, maximum false positive rate, maximum false negative rate, maximum memory overhead, maximum parity difference, maximum error rate difference, and minimum area under a receiver operating characteristic curve; and
the one or more model pipelines include model pipelines selected from a group consisting of eXtreme Gradient Boosting classifier models, extra trees classifier models, quadratic discriminant models, Gaussian Naive Bayes models, and K nearest neighbors classifier models.

16. A computer system for determining that one or more model pipelines satisfy one or more constraints, the computer system comprising:
one or more computer processors, one or more computer-readable storage media, and program instructions stored on the one or more of the computer-readable storage media for execution by at least one of the one or more processors to cause a method to be performed comprising:
detecting a user uploading data and one or more constraints;
collecting the data and the one or more constraints; and
determining that one or more model pipelines satisfies all of the one or more constraints based on applying one or more algorithms to the collected data, the collected constraints, and to multiple model pipelines, wherein the one or more algorithms use an alternating direction method of multipliers (ADMM) based joint optimization approach in determining that one or more of the model pipelines satisfies all of the one or more constraints, and the ADMM based joint optimization approach decomposes the determining into sub-problems solved iteratively, the sub-problems comprising:
one or more hyperparameter problems solving hyperparameter optimization for the one or more model pipelines, and
a pipeline selection problem solved by a combinatorial multi-armed bandit algorithm,
wherein the ADMM based joint optimization approach uses explicit Boolean variables to encode selection of the multiple model pipelines.

17. The computer system of claim 16, further comprising:
applying the determined one or more model pipelines to the collected data.

18. The computer system of claim 17, further comprising:
notifying the user of the determined one or more model pipelines before applying the determined one or more model pipelines to the collected data.

19. The computer system of claim 16, wherein:
the one or more algorithms re-optimize the one or more hyperparameters based on the selected model pipelines.

20. The computer system of claim 16, further comprising:
receiving feedback indicative of whether the determined one or more model pipelines appropriately satisfied all of the constraints; and
adjusting the one or more algorithms based on the received feedback.

* * * * *